United States Patent [19]

Yatagai et al.

[11] 3,958,701
[45] May 25, 1976

[54] LOAD-SHIFTING CARGO TRANSFER APPARATUS

[75] Inventors: Shukuro Yatagai; Katunori Tamura, both of Kitakyushu, Japan

[73] Assignee: Japanese National Railways, Tokyo, Japan

[22] Filed: Feb. 13, 1974

[21] Appl. No.: 442,001

[30] Foreign Application Priority Data
Feb. 22, 1973  Japan.......................... 48-22264[U]

[52] U.S. Cl................................ 214/38 C; 254/2 C
[51] Int. Cl.²......................................... B65G 67/02
[58] Field of Search ............. 214/38 C, 38 CC, 516;
193/35 SS; 254/2 C, 93 HP

[56] References Cited
UNITED STATES PATENTS

| 2,601,171 | 6/1952 | Schreck .......................... 254/2 C X |
| 2,828,027 | 3/1958 | Stevenson et al................. 214/38 C |
| 3,283,926 | 11/1966 | Eckhardt et al. .................. 214/38 C |
| 3,437,219 | 4/1969 | Stevenson....................... 214/516 X |
| 3,439,790 | 4/1969 | Langley et al................... 193/35 SS |
| 3,610,580 | 10/1971 | Johnstone.................... 214/38 CC X |

Primary Examiner—Robert G. Sheridan
Attorney, Agent, or Firm—Armstrong, Nikaido & Wegner

[57] ABSTRACT

The present invention relates to a cargo transfer apparatus of load-shifting type. The load-shifting type cargo transfer apparatus according to the present invention consists of a stationary unit and a mobile unit. The stationary unit comprises a series of equally spaced parallel projections of equal width and height. The mobile unit comprises a main frame of a hollow square section with a rectangular top, and a support equipped with a plurality of tines integrally attached like comb-teeth at equal intervals perpendicularly to the longitudinal direction of said main frame, the tines having a H-shaped cross section and having rotatable rollers fitted to a plurality of shafts fixed at both ends to both ends of the underside of the tine at the same height. A cargo holder covers the top and both side surfaces of the tines in their longitudinal direction and has elliptical guide holes to engage a plurality of knock-pins provided at equal heights on the upper sides of tines. A flexible hose is sandwiched between the tine and the cargo holder, the flexible hose being connected through pressure ducts to the supply and exhaust mechanisms for a working fluid such as pressurized oil or compressed air.

1 Claim, 9 Drawing Figures

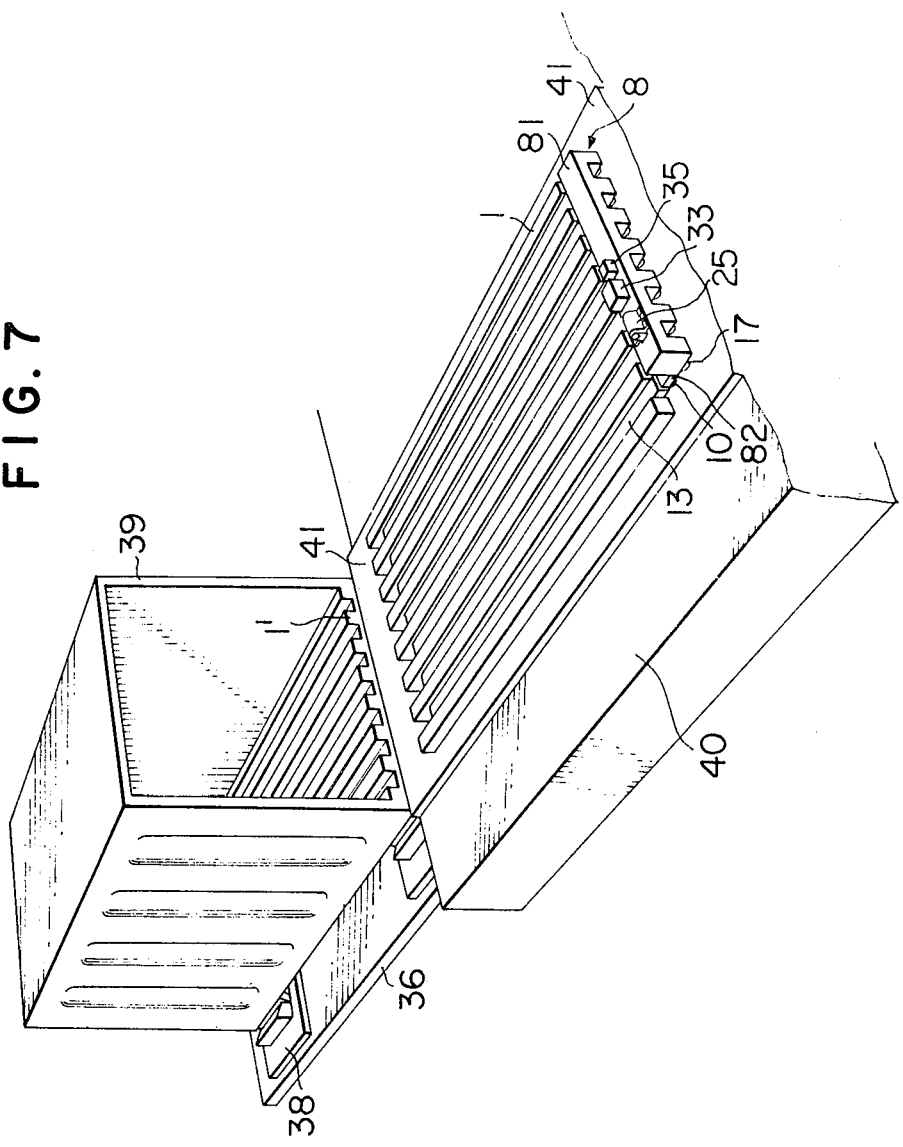

LOAD-SHIFTING CARGO TRANSFER APPARATUS

BACKGROUND OF THE INVENTION

At present bulky cargo or unitized cargo is in most cases transferred, loaded or unloaded by a known forklift truck or hand lift. The overall width or length of the fork is structurally limited and even the largest fork measures three meters at most in length. Therefore, when the conventional fork is employed for the loading or unloading of containers or trucks, the fork operation has to be repeated many times. This creates large time losses and the turnover of containers or trucks is decreased. This makes it necessary to make an excessive number of containers or trucks ready for use.

The most popular mode of mechanical cargo handling is the combination of a forklift or hand lift with a pallet. This mode of mechanical cargo handling, however, involves the following trouble in addition to those inherent in the fork of the known forklift or handlift. Namely, in this mode of handling, a pallet has to accompany cargo to the destination of shipment and accordingly, until the destination is reached and the handling there is finished, the pallet is not free for diversion to other uses. An empty pallet after delivery of cargo at destination has to be stowed away or held until returned to the origin of shipment and for this purpose much space, time and money have to be wasted. Individual enterprises are striving for joint use of pallets through unification or pooling of a wide variety of pallets in use, but as yet this aim has not been attained. Thus, under the present circumstances, pallets have to be made available in the same excessive quantities as here-to-fore.

SUMMARY OF THE INVENTION

The apparatus according to the present invention consists of a stationary unit and a mobile unit. The stationary unit comprises a series of projections of equal width and equal height equi-spaced in parallel. The mobile unit comprises a main frame of a hollow square section with a rectangular top and a support equipped with a plurality of tines integrally attached like combteeth at equal intervals perpendicular to the longitudinal direction of said main frame. The tines have an H-shaped cross section and have rotatable rollers fitted to a plurality of shafts fixed at both ends to both ends of the underside of the tine at the same height. A cargo holder covers the top and both side surfaces of the tines in their longitudinal direction and has elliptical guide holes to engage a plurality of knockpins provided at equal heights on the upper sides of the tines. A flexible hose is sandwiched between the tine and the cargo holder, the flexible hose being connected through pressure ducts to the supply and exhaust mechanisms for a working fluid such as pressurized oil or compressed air.

BRIEF DESCRIPTION OF THE DRAWINGS

FIG. 6 (b) is a longitudinal section view showing the lift mechanism of FIG. 2 in a working state.

FIG. 7 is an oblique view showing the mobile unit of FIG. 2 installed on the cargo-handling platform as related to the corresponding container.

DESCRIPTION OF THE PREFERRED EMBODIMENT

Referring to FIG. 1 to 8, the load shifting type cargo-handling apparatus of the present invention is to be described in detail.

Figure 1:
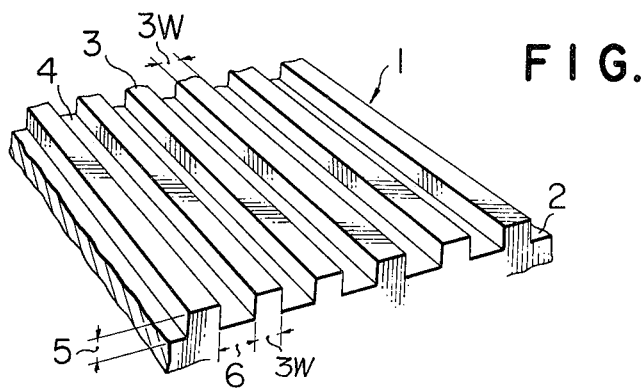
FIG. 1 is an oblique view of the stationary unit constituting the present invention.

The stationary unit constituting the present invention is illustrated in FIG. 1. The stationary unit 1 represents the floor of transport vessel or transport vehicle such as railway vehicle, truck, container, cargo-handling platform or rack. On its base 2 are integrally formed a plurality of parallel equally spaced projections 3 of equal height and width.

FIGS. 2–5 illustrate the mobile unit constituting the present invention.

Figure 2:
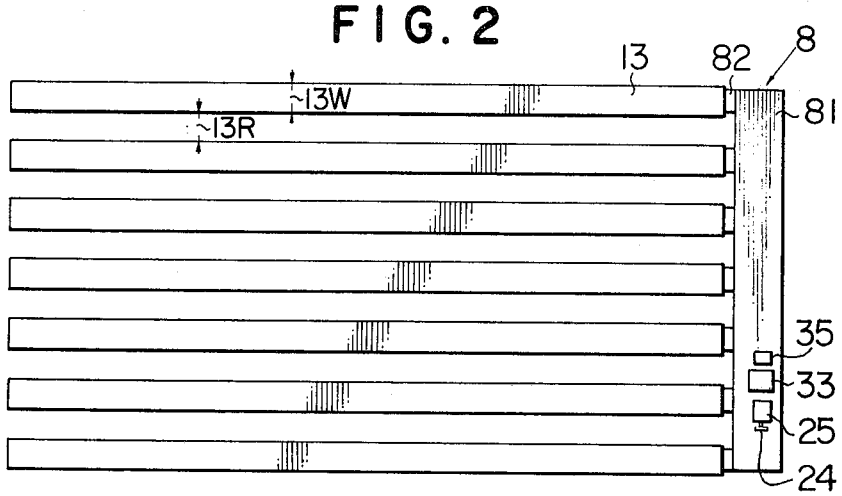
FIG. 2 is a plan view of the mobile unit constituting the present invention.

The mobile unit 8 in FIGS. 2 to 5 represents an integral composition of the main frame 81 fabricated of a hollow section and the plurality of tines 82. The top surface of the main frame 81 is, as illustrated in FIG. 2, rectangular in shape and the bottom surface of it has projections 811 of a specified height integrally formed thereon in the longitudinal direction. A plurality of tines 82 are integrally formed at equal intervals like combteeth, perpendicular to the projections 811. At both ends of the bottom of each tine 82, are shafts 9 arranged in parallel at specified intervals in the longitudinal direction of tines, with both ends of the shaft fixed at a specified height. Each shaft 9 is fitted with a rotatable roller 10. On both sides of the junction between the main frame 81 and the tine 82, are provided bearings 14, to which are fitted the drive wheel 17 by means of the shaft 15, both ends of which are fixed. The drive wheel 17 is fitted concentrically and integrally with a sprocket 16. When the sprocket 16 is turned by the second chain 18, the torque is transmitted to the drive wheel 17. The plurality of rollers 10, which are driven, can move the mobile unit together with the load held thereon. At a specified position on the top surface of the main frame 81 is installed the prime mover 25 for running. The sprocket 24, whose center is fitted to the output shaft 251 of the prime mover, is coupled through the first chain 23 to the corresponding sprocket 22. The center of the sprocket 22 is fixed to the intermediate shaft 21 supported by a plurality of bearings 20 provided at a specified position within the main frame 81. The intermediate shaft 21 extends in the longitudinal direction of the main frame 81, and, a sprocket 19 is fitted thereto at a position of the intermediate shaft 21 which corresponds to the sprocket 16. At the junction between the main frame 81 and each tine 82 is fitted a drive wheel of the same construction as the one described above. Therefore, the torque of the prime mover 25 for running is transmitted through the sprocket 24, the first chain 23, the sprocket 22, and the intermediate shaft 21 to the corresponding parts, i.e., the sprocket 19, the second chain 18, and the sprocket 16. Thus the plurality of drive wheels 17 can be simultaneously rotated at the same speed in the same direction. The prime mover 25 for running may be any known device, such as an electric motor, a hydraulic motor or an air motor. Depending on the case, it is not always necessary to install such a drive mechanism for running within the system, an indirect method may be employed such as driving by some means outside of the system such as wire or chain.

The cargo holder 13 is constructed of channel steel such that the holder may cover the top and outside of all tines 82 in the longitudinal direction. Namely the top inside of the channel steel of the cargo holder 13 covers the top of the tine 82, while the two sides of said channel steel cover the corresponding sides or the whole of tine 82.

On both longitudinal sides of the cargo holder 13 there are a plurality of elliptical guide holes 12 with equal vertical length and equal longitudinal width at a specified height, equally spaced and perpendicular to the longitudinal direction. Into the plurality of guide holes 12 go simultaneously one end of a plurality of knock-pins 11, whose other ends are firmly embedded at specified positions on both sides of tine 82.

The guide holes 12 have such width in vertical and longitudinal direction that the cargo holder 13 can be free to slide in the vertical direction to the tine 82, but cannot be free to shift in the longitudinal direction; thereby the distance of said vertical sliding, i.e., the "amount of lift", depends on the vertical length of guide hole 12. In other words, the optimum amount of lift for the cargo holder 13 in relation to the tine 82 is determined depending on the vertical length of guide hole 12.

The flexible hose 26 is a conventional pressure-resistant flexible one made of oil-proof rubber or cloth and it is sandwiched between the top of tine 82 and the top underside of cargo holder 13.

In the present embodiment using H-steel for the tine 82 and ⊓-steel for the cargo holder 13, the flexible hose 26 is housed in the top-open space 83 of the tine 82 and it is so arranged that the top of said flexible hose 26 can contact the top inside of the ⊓-steel of the cargo holder. The two open ends of the flexible hose 26 are respectively fitted with clamp metals 30 and 30' using the bolts 31 and 31', so that the interior is kept airtight. At one end of the flexible hose 26 a pipe joint 27 is provided airtight using the packing 28 and the nut 29 by the conventional method. Meanwhile the pipe joint 27 is connected to one end of the pressure duct 32. The other end of the pressure duct 32 is connected to the pipe joint 34 provided in pressure pump 33 installed at the top of the main frame 81. Pressurized oil or compressed air supplied from the pressure pump 33 (hereafter to be called the working fluid), when it is charged or discharged, causes the flexible hose 26 to inflate or deflate. The working fluid may be charged or discharged freely by the conventional method using the control board 35 installed adjacent to the pressure pump 33.

Figure 3:
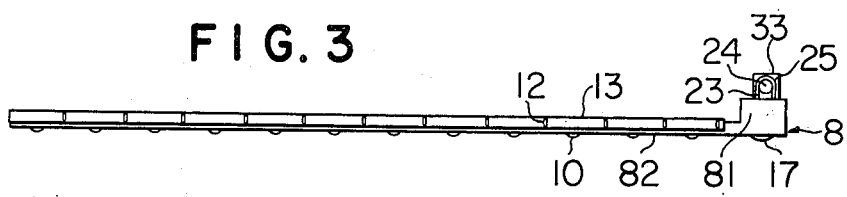
FIG. 3 is a side view corresponding to FIG. 2.
Figure 4:
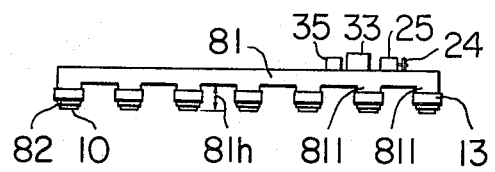
FIG. 4 is a front view corresponding to FIG. 2.

By integrally forming a plurality of tines 82 and cargo holder 13 such as described above in parallel and perpendicular to the main frame 81, the mobile unit as illustrated in FIGS. 2–4 can be constructed.

The mobile unit thus constructed and the stationary unit illustrated in FIG. 1 are put together in the following functional relationship. Namely, the width 3w of the projection 3 on the stationary unit 1 is set smaller than the spacing 13R of the cargo holders 13. The width 13w of the cargo holder 13 is set smaller than the width 6 of the spacing 4 of the projection on the stationary unit 1. The height 81h of the under side of the main frame 81 (FIG. 4) is greater than the height 5 of projection on the stationary unit. The longitudinal length of the projection 3 and cargo holders are nearly equal. Thus the tines 82 and cargo holders 13 of the mobile unit can simultaneously go into the gaps between the corresponding projections of the stationary unit, and under this condition the mobile unit is free to extend along the projections in the longitudinal direction. The height of projection top and the height of cargo-holder top are in such a relationship that when, as described later, the flexible hose 26 is inflated to a maximum, the top of cargo-holder 13 is above the top of the projection 3 of stationary unit 1, but when the flexible hose 26 is deflated, the top of cargo holder 13 is below the top of the projection 3 on the stationary unit 1.

Figure 6A:
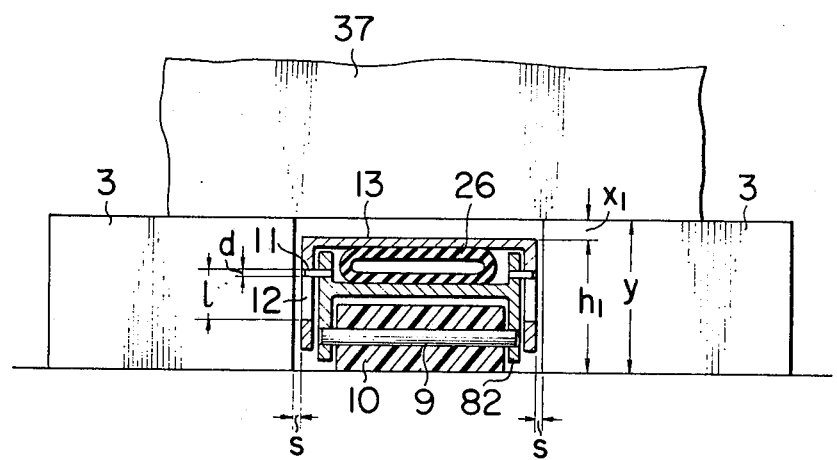
FIG. 6 (a) is a longitudinal section view showing the lift mechanism of FIG. 2 in a non-working state.
Figure 6B:
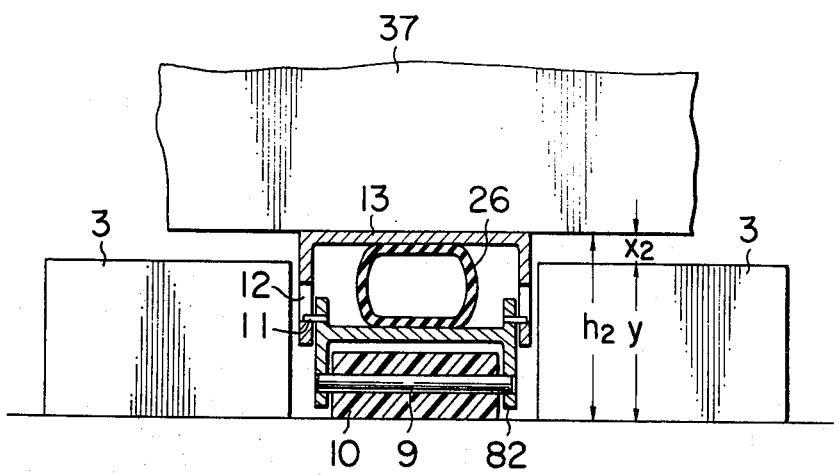

Referring to FIGS. 6 (a) and (b), the process of cargo transfer under such arrangement according to the present invention is explained.

FIGS. 6 (a) and (b) illustrate a case of cargo being transferred from the stationary unit of FIG. 1 to the mobile unit.

FIG. 6 (a) shows the state of cargo 37 being placed on the stationary unit, when the plural tines 82 and cargo holder 13 of the mobile unit going simultaneously into the gaps between the projections of the stationary unit and the tines and cargo holders extending longitudinally over the whole length of the gaps between said projections. The flexible hose 26 is deflated; therefore the top of cargo holder 13 is below the top of the projection 3 and the bottom of cargo 37 is higher than the top of the cargo holder 13. Thus even when cargo is present on the projections 3 of the stationary unit, the tines and cargo holders can easily go into the gaps between said projections. Under this condition, for instance by operating the control board 35, the working fluid is charged from the pressure pump 33 through the pressure duct 32 into the flexible hose 26. Thereupon the flexible hose 26 is inflated and in consequence the cargo holder 13 rises. With increased inflation of the flexible hose 26, the cargo holder 13 continues to rise, but ceases to rise when the bottom of the guide hole 12 formed on the side of the cargo holder 13 hits the knock-pin 11 provided on the upper side of the tine. The amount of lift of the cargo holder 13 thereby can be expressed as the length $l$ of the guide hole 12 in the vertical direction minus the diameter $d$ of the knock-pin 11. Thus by setting the relation such that when the cargo holder 13 reached the maximum height of rising, the top of the cargo holder 13 is a specified extent higher than the top of the projection 3, the cargo holder 13, can be made by the force of the working fluid to overcome in its rising process the load of cargo placed on the stationary unit and as illustrated in FIG. 6 (b) the cargo 37 on the stationary unit can be transferred onto the plural cargo holder 13.

For the purpose of transferring cargo 37 from the cargo holder 13 of the mobile unit onto the projections of the stationary unit, the above procedure has only to be reversed. Namely, the cargo holder 13 of the mobile unit on which cargo 37 is held are simultaneously inserted into the corresponding gaps between the projections of the stationary unit and the cargo holder 13 extend longitudinally along the projections 3. In this case flexible hose 26 is amply supplied with the working fluid and accordingly the cargo holder 13 is at the topmost position. Thereby the top of the cargo holder 13 is by a specified extent higher than the top of the stationary unit and in consequence the bottom of cargo on the cargo holder 13 is that much higher than the top of the projection. Thus even with cargo present on the cargo holders 13, the mobile unit can easily go into the corresponding gaps between the projections of the stationary unit. Under this condition, for instance by operating the control board 35, the working fluid in the flexible hose 26 is discharged through the pressure duct 32, thereby deflating the flexible hose 26 and lowering the cargo holder 13. The lowering of the cargo holder 13 is stopped when the top of the guide hole 12 formed on the side of the cargo holder 13 hits the knock-pin 11 provided on the side of the tine 82, resulting in the state illustrated in FIG. 6 (a). In the above lowering process, cargo 37 on the cargo holder 13 is transferred onto the projections 3 of the stationary unit.

In the embodiment illustrated in FIGS. 6 (a) and (b), it is so arranged that when the cargo holder 13 reaches the bottommost position, the top of the cargo holder 13 is a certain distance $x_1$ lower than the top of the projection 3 on the stationary unit; and when the cargo holder 13 reaches the topmost position, the top of the cargo holder 13 is a certain distance $x_2$ higher than the top of the projection on the stationary unit. This relation may be expressed as follows:

$$y - h_1 = x_1 \qquad (2)$$

$$h_2 - y = x_2 \qquad (3)$$

Where $y$ is the height of projection 3 on the stationary unit, $h_1$ is the height of top of the cargo holder 13 at its bottommost position, and $h_2$ is the height of top of the cargo holder 13 at its topmost position. In FIGS. 6 (a) and (b), $s$ denotes the clearance between the longitudinal side surface of cargo holder 13 and the opposite side surface of the projection when the cargo holder 13 of the mobile unit go into the corresponding gaps between the projections of the stationary unit.

The above spaces $x_1$, $x_2$ and $s$ are provided for the purpose of helping smooth movement through the projection gaps of the cargo holder 13 at its topmost or bottommost position, thus facilitating the transfer of cargo. The values of $x_1$, $x_2$ and $s$ are disirably to be minimized, but their selection should be made with allowance for possible bulging or deflection of cargo bottom and possible skewness of the cargo holder 13 and the projections. According to the results of an experiment carried out by the present inventor, in the case of the projection gap in the stationary unit being 120 mm and cargo being packed in corrugated paperboard, cargo handling can take place without difficulty when the values of $x_1$, $x_2$ and $s$ are about 10 mm.

Figure 8:
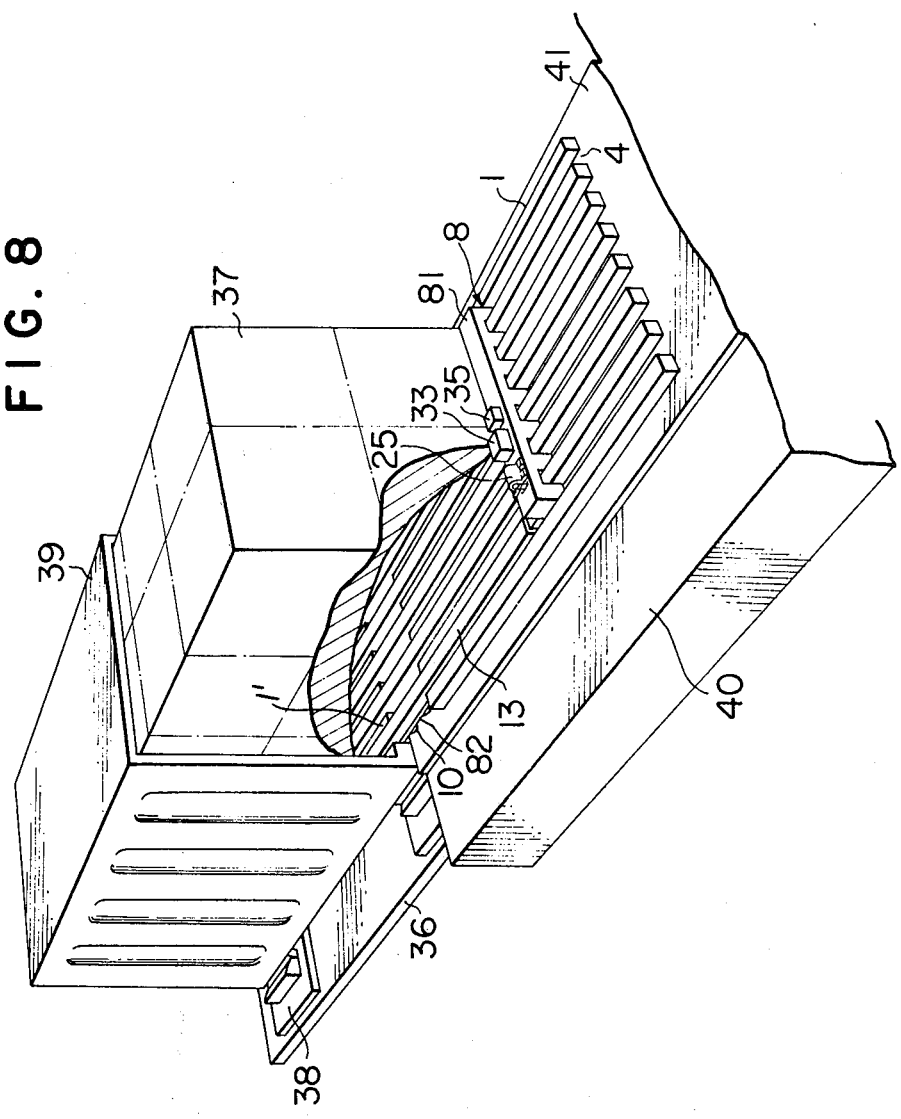
FIG. 8 is an oblique view illustrating cargo as being loaded into a container from the cargo-handling platform by means of the system according to the present invention.

FIGS. 7 and 8 illustrate application of the load-shifting type cargo transfer apparatus according to the present invention. In FIG. 7, 40 is the cargo handling platform, at a specified position of which is provided a flat base 41 which is constructed of steel plate or paved with concrete, and at a specified spot on said flat base 41 is set the stationary unit 1 shown in FIG. 1. 39 is a conventional container, the floor 1' of which is constructed in the same way as the stationary unit of FIG. 1. 36 is a container holder and the container 39 is held on said container holder 36 with corrugated top anti-displacement board 38. The container holder 36 can be moved back and forth as well as right and left by a conventional electro-mechanical means. By such movement of the holder, the positional relation of the stationary unit 1' formed on the floor of the container 39 to the stationary unit 1 installed on the flat base 41 can be so adjusted that their corresponding ends of the projections may fall into line. Thus, in FIG. 7 the plural tines 82 of the mobile unit 8 which have been moved on the flat base 41 simultaneously go into the corresponding gaps between the projections of the stationary unit 1 installed on the flat base 41. The mobile unit 8 thus inserted can move in the direction of the container through the projection gaps, while the cargo holders 13 of the mobile unit which have left the projection gaps of the stationary unit 1 can smoothly go into the corresponding projection gaps of the stationary unit 1' formed on the floor of the container 39, and move through these gaps.

FIG. 8 illustrates a case of cargo 37 placed on the stationary unit 1 of the cargo handling platform being transferred by the present invention into the container, when the container 39 and the stationary unit 1 on the cargo handling platform 40 are arranged as shown in FIG. 7. Cargo 37 is present on the stationary unit 1 of the cargo handling platform. When the prime mover 25 of the mobile unit is started as specified, the plural drive wheels 17 of the mobile unit are driven in the specified direction: the rollers 10 thus driven move the mobile unit as a whole along the flat base 41; an in consequence the tips of the tines and cargo holders in the mobile unit come to face the corresponding right ends in FIG. 8 of the projection gaps in the stationary unit 1 on the cargo handling platform. Thereby the flexible hose 26 is deflated and the cargo holder 13 is at the bottommost position; accordingly the top of the cargo holder 13 is below the projection tops of the stationary unit 1, 1'. When under this condition the prime mover 25 is started, the cargo holder 13 and the tines 82 of the mobile unit 8 similtaneously go into the corresponding projection gaps of the stationary unit 1 on the cargo handling platform and move through said gaps toward the cargo 37. When the tines and cargo holders of the mobile unit 8 have fully extended longitudinally in said gaps, the prime mover 25 is cut off to stop the movement of the mobile unit.

Figure 5:
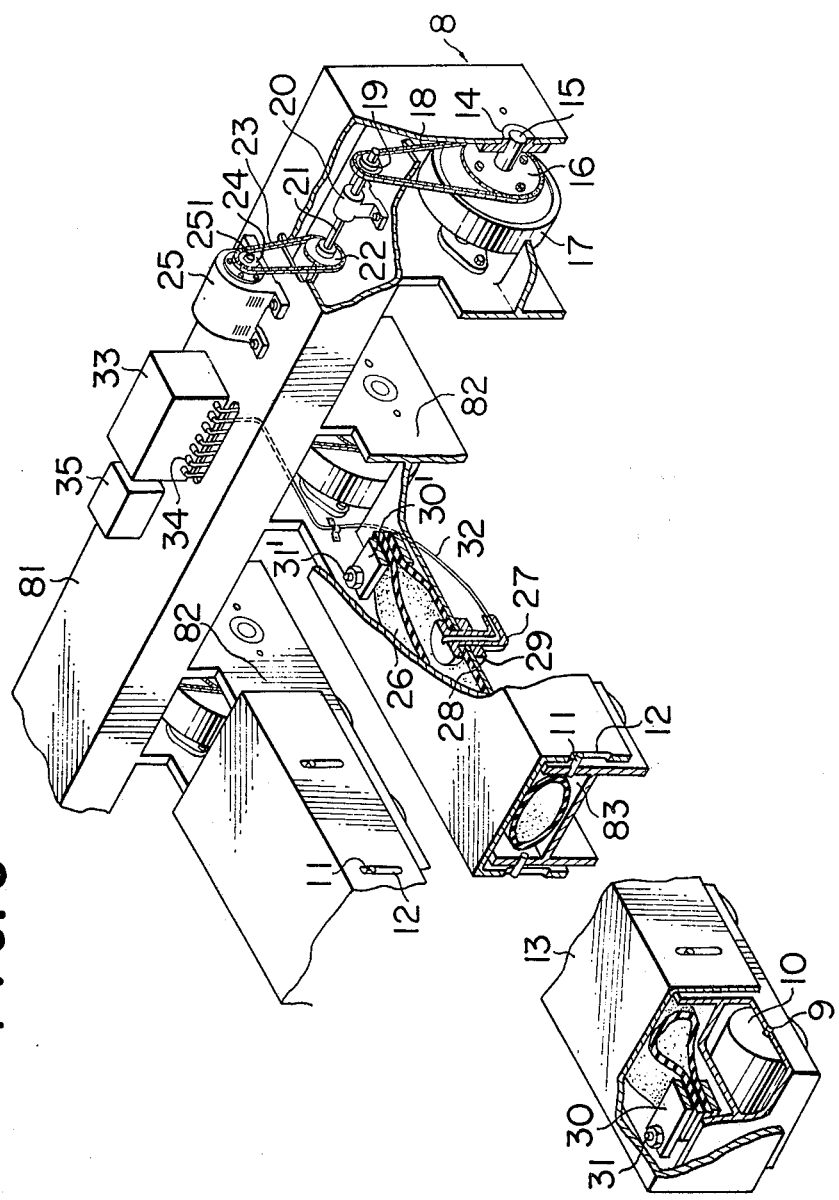
FIG. 5 is an oblique view showing a partial section corresponding to FIG. 2.

Next, when by operation of the control board 35 in FIG. 5 the working fluid is supplied from the pressure pump 33 to the flexible hose 26, said flexible hose 26 is inflated and the cargo holder 13 rises. In the process when the cargo holder 13 reaches the topmost position, cargo held across the projections of the stationary unit 1 on the cargo handling platform is transferred on to the cargo holder 13. After transfer of cargo onto the cargo holder 13, the prime mover 25 is again started and the tines of the mobile unit 8 make further travel through the corresponding projection gaps formed on the floor of the container 39. When the tines of the mobile unit 8 have fully extended longitudinally in the projection gaps formed on the floor of the container said control board 35 in FIG. 5 is operated to discharge the working fluid out of the flexible hose 26. As the result the flexible hose 26 is deflated and the cargo holder 13 drops to the bottommost position. In the course of the cargo holder 13 being lowered, cargo 37 held on the cargo holder 13 is transferred onto the projections formed on the floor of the container 39. Thus cargo 37 which has been on the stationary unit of the cargo handling platform 40 can be transferred into the container 39. After the cargo transfer is completed, the prime mover 25 is started to turn the drive wheel 17 in reverse direction to the above and thereby through the projection gaps of the container floor and then through the projection gaps of the stationary unit on the cargo handling platform, the mobile unit is moved along the flat base 41 to its initial position.

The above procedure has only to be reversed, to transfer cargo in the container 39 onto the stationary unit of the cargo handling platform. Namely, the mobile unit, of which the cargo holder 13 is at bottommost position, is moved through the projection gaps of the stationary unit 1 on the cargo handling platform and then through the projection gaps of the stationary unit 1' formed on the container 39; the tines and cargo holders of the mobile unit are made to extend fully in the longitudinal direction of projection gaps of the stationary unit 1'; then the cargo holder 13 is raised to the topmost position; thereafter cargo on the container floor is transferred onto the cargo holder 13; in this state the mobile unit is shifted toward the cargo-handling platform; the tines of the mobile units are made to extend longitudinally along the stationary unit on the cargo-handling platform; thereupon the cargo holder 13 is lowered to the bottommost position; and thus cargo on the container floor can be transferred onto the stationary unit on the cargo-handling platform.

The above example is an application of the present invention to cargo transfer between container and stationary unit on the cargo-handling platform. The system according to the present invention, however, is also applicable to cargo transfer between transport vessels such as railway vehicle, truck or container and stationary unit installed at cargo distribution point. For instance, if the floor in the transport vehicle or in the transport vessel is designed with the same in structure as the stationary unit installed at cargo distribution point, cargo transfer can take place on absolutely the same working principale as described above.

If in the present invention the size and shape of the stationary unit and the mobile unit and the force of the working liquid to raise or lower the cargo holder are appropriately set, it will be possible to execute the transfer of bulky cargo or unitized cargo in a single step which is a far more efficient method of cargo transfer than the conventional method relying on forks.

Under the mechanical cargo handling system with combination of forklift or handlift and pallet, as pointed out above, time and money are inevitably wasted on account of empty pallets to be stowed away or to be returned to the origin of shipment. According to the present invention with no need for pallets, the same mode of mechanical cargo handling system can be easily introduced between the transport vessel and the container or a transport vehicle like a truck and the cargo-handling facilities on the ground distribution points.

The present invention promises rapid dissemination of a coordinated through transport system between different means of transport.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A load shifting type cargo transfer system comprising:
   a. a stationary unit having a plurality of equally spaced parallel projections of the same height and width; and
   b. a mobile unit comprising,
      a main frame means,
      a support means including a plurality of unitary H-shaped tines extending perpendicularly from said main frame means, wherein each tine has at least one roller extending from the bottom thereof,
      unitary cargo holder means having a top surface and side surfaces extending downwardly therefrom surrounding a portion of each of said tines, wherein said cargo holder means are dimensioned to fit between the projections of said stationary unit, and said cargo holder means includes closed guide slots and said tines include knock-pins, said knock pins extending into said guide slots thereby limiting the upward and downward movement of said cargo holder means relative to said tines,
      lifter means for raising and lowering said cargo holder means with respect to said tine, said lifter means including a hose positioned between said tines and said cargo holder means in the upper portion of said H wherein said hose in inflated and deflated by the insertion and withdrawal of a working fluid therefrom, and the sides of the upper portion of said H provides lateral stability to said side surfaces of said cargo holder means, and
      drive means mounted on said main frame means for moving said mobile unit, said drive means comprising a prime mover and drive wheel means operatively connected to said prime mover wherein said drive wheel means extend from the bottom of said main frame means.

* * * * *